(12) United States Patent
Nagura et al.

(10) Patent No.: US 7,145,847 B2
(45) Date of Patent: Dec. 5, 2006

(54) ANNEALED OPTICAL INFORMATION RECORDING MEDIUM AND OPTICAL INFORMATION RECORDING/REPRODUCING APPARATUS FOR THE SAME

(75) Inventors: Chihiro Nagura, Tokyo (JP); Tsutomu Shiratori, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 617 days.

(21) Appl. No.: 10/640,024

(22) Filed: Aug. 14, 2003

(65) Prior Publication Data

US 2004/0042357 A1 Mar. 4, 2004

(30) Foreign Application Priority Data

Aug. 28, 2002 (JP) .............................. 2002-249008
Aug. 28, 2002 (JP) .............................. 2002-249009

(51) Int. Cl.
G11B 7/00 (2006.01)
(52) U.S. Cl. .................................. 369/44.26; 369/44.37
(58) Field of Classification Search ...................... None
See application file for complete search history.

(56) References Cited

U.S. PATENT DOCUMENTS

| | | | |
|---|---|---|---|
| 5,418,076 A | 5/1995 | Shiratori | 428/694 EC |
| 5,450,387 A * | 9/1995 | Ono et al. | 369/44.26 |
| 5,629,909 A | 5/1997 | Shiratori | 369/13 |
| 5,648,134 A | 7/1997 | Shiratori et al. | 428/641 |
| 5,936,915 A | 8/1999 | Fujii et al. | 369/13 |
| 5,949,743 A | 9/1999 | Shiratori | 369/13 |
| 5,956,296 A | 9/1999 | Yamamoto et al. | 369/13 |
| 5,962,154 A | 10/1999 | Hashimoto et al. | 428/694 ML |
| 5,966,348 A | 10/1999 | Hashimoto et al. | 369/13 |
| 6,027,825 A | 2/2000 | Shiratori et al. | 428/694 ML |
| 6,084,830 A | 7/2000 | Ashinuma et al. | 369/13 |
| 6,180,208 B1 | 1/2001 | Shiratori et al. | 428/141 |
| 6,197,440 B1 | 3/2001 | Shiratori | 428/694 SC |
| 6,221,219 B1 | 4/2001 | Hashimoto et al. | 204/192.2 |
| 6,249,489 B1 | 6/2001 | Fujii et al. | 369/13 |
| 6,265,062 B1 | 7/2001 | Shiratori | 428/332 |
| 6,345,016 B1 | 2/2002 | Shiratori | 369/13.54 |
| 6,388,963 B1 * | 5/2002 | Tanaka | 369/44.26 |
| 6,403,148 B1 | 6/2002 | Shiratori et al. | 427/128 |
| 6,403,205 B1 | 6/2002 | Shiratori | 428/212 |
| 6,454,915 B1 | 9/2002 | Shiratori et al. | 204/192.2 |
| 2001/0005535 A1 * | 6/2001 | Tsutsui et al. | 428/64.1 |
| 2002/0058120 A1 * | 5/2002 | Uchida et al. | 428/64.4 |

FOREIGN PATENT DOCUMENTS

| | | |
|---|---|---|
| JP | 6-290496 | 10/1994 |
| JP | 2000-331383 | 11/2000 |

* cited by examiner

*Primary Examiner*—Andrea Wellington
*Assistant Examiner*—Lixi Chow
(74) *Attorney, Agent, or Firm*—Fitzpatrick, Cella, Harper & Scinto

(57) ABSTRACT

A high density optical information recording medium comprises a substrate having rows of land and groove and a recording layer formed on the substrate. Each of the rows of land or groove includes at least two recording tracks separated by a denatured region produced by irradiating e.g. the center of each row in the recording layer with a denaturing light beam accompanied with one or two sub-beams for tracking control. Recording and reproduction of information can be performed likewise by using a recording or reproduction light beam accompanied with one or two tracking sub-beams.

2 Claims, 16 Drawing Sheets

RADIAL DIRECTION →

RADIAL DIRECTION

ANNEALED OPTICAL INFORMATION RECORDING MEDIUM AND OPTICAL INFORMATION RECORDING/REPRODUCING APPARATUS FOR THE SAME

BACKGROUND OF THE INVENTION

1. Field of the Invention

The present invention relates to an optical information recording/reproducing apparatus for recording information on or reproducing recorded information from an optical information recording medium. In particular, the invention relates to an optical information recording/reproducing apparatus for recording information on or reproducing recorded information from a recording medium having at least two rows of information tracks in one groove or between grooves.

2. Related Background Art

In general, reproduction of information recorded in an optical information recording medium is carried out in such way that a minute spot is formed on a signal surface by a condensing lens and then a reflected light is received by a photoelectric conversion device. The demand for high densification of this optical information recording is increasing year by year.

As for a method of attaining this high densification, for example, there is known a method in which the high densification in a track direction is realized beyond restriction of optical resolution using means such as domain wall displacement detection (DWDD) means. For realizing the higher densification, it is necessary to narrow a track pitch to realize the densification in a radial direction. However, if a period of guide grooves is brought close to the resolution of an optical system, then a sufficient tracking signal can not be obtained. As well known, when a wavelength of a convergent light is assigned λ, and a numerical aperture of an objective lens is assigned NA, the resolution d of an optical system is determined on the basis of the following expression:

$$d = \lambda/(2 \times NA)$$

For example, since in an optical system as being used in DVD-RW, a wavelength λ of a light source is 635 nm, and a numerical aperture NA of an objective lens is 0.60, resolution d becomes 0.53 µm. If a track pitch of a medium is brought close to a value of 0.53 µm, a sufficient tracking signal can not be obtained. Thus, in DVD-RW, a track pitch is set to 0.74 µm and under this condition, a tracking signal is obtained.

For the purpose of relaxing such a restriction due to the resolution of the optical system, as described in Japanese Patent Application Laid-Open No. 2000-331383, for example, there is proposed an optical recording medium in which tracks are formed so that widths of adjacent grooves become different from each other. FIG. 16 shows a recording medium described in Japanese Patent Application Laid-Open No. 2000-331383. In the recording medium described in Japanese Patent Laid-Open No. 2000-331383, since a period structure is provided in which two tracks apparently correspond to one period, a tracking signal can be obtained even if a track pitch is narrowed down to a track pitch beyond a resolution limit.

However, in case of the recording medium described in Japanese Patent Laid-Open No. 2000-331383, it is necessary to form grooves having different widths on both sides of each track. Thus, in order that a tracking signal has sufficient modulation, it is necessary to increase a difference in width between the grooves. This is a cause for restricting the high densification.

SUMMARY OF THE INVENTION

The present invention provides an optical information recording medium with which even higher densification can be realized, and an optical information recording/reproducing apparatus.

Therefore, according to the present invention, there is provided an optical information recording medium, comprising:

a substrate having lands and grooves;

a recording layer formed on the substrate;

at least two rows of information tracks adapted to record therein or reproduce therefrom information and formed in the recording layer on the lands or grooves; and denatured regions formed on the lands or grooves and between the information tracks.

Further, according to the present invention, there is provided an optical information recording/reproducing apparatus comprising:

means for applying two sub-beams and a main beam onto the recording layer, the main beam being located between the sub-beams;

a light receiving element for detecting reflected lights of the sub-beams from the medium; and means for generating a tracking error signal on the basis of outputs from the light receiving element, wherein information is recorded or reproduced with a spot of the main beam while carrying out tracking control on the basis of the tracking error signal.

DESCRIPTION OF THE PREFERRED EMBODIMENTS

Preferred embodiments of the present invention will hereinafter be described in detail with reference to the accompanying drawings.

(First Embodiment)

Figure 1A:
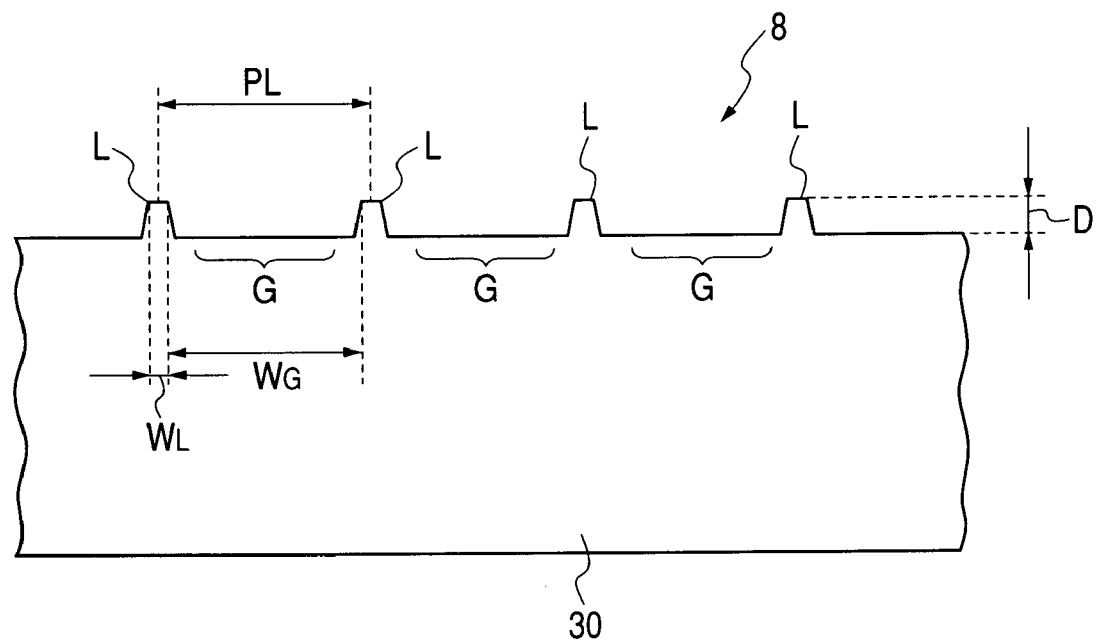
FIGS. 1A and 1B are cross sectional views each showing a structure of a magneto-optical disc for use in a first embodiment of an optical information recording/reproducing apparatus of the present embodiment.
Figure 1B:
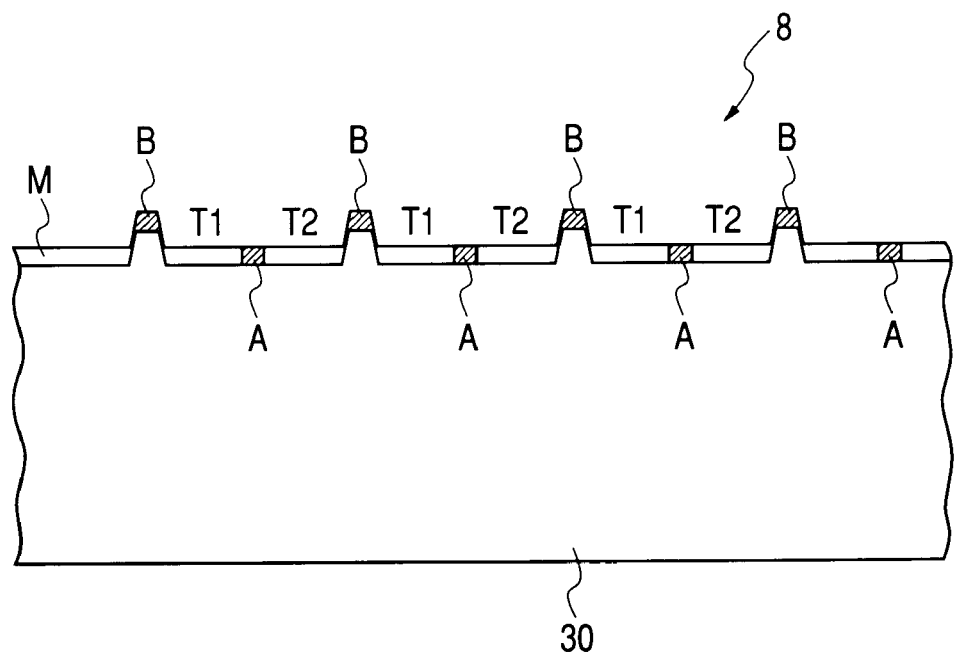

FIGS. 1A and 1B are cross sectional views each showing a structure of a magneto-optical disc for use in a first embodiment of an optical information recording/reproducing apparatus of the present invention. FIG. 1A is a cross sectional view of a substrate of a magneto-optical disc, and FIG. 1B is a cross sectional view of the magneto-optical disc. First of all, as shown in FIG. 1A, a substrate 30 is formed by injection molding of a resin material such as polycarbonate. Lands L and grooves G are formed on a surface of the substrate. In addition, a magneto-optical disc 8 shown in FIG. 1B is a domain wall displacement type magneto-optical medium from which a domain wall of a recording mark is displaced to reproduce recorded information.

Since the domain wall displacement type magneto-optical medium is described in Japanese Patent Application Laid-Open No. 6-290496, for example, a detailed description thereof is omitted here for the sake of simplicity. A magnetic film M in which a displacement layer, a switching layer, and a recording layer are laminated is formed on the substrate 30. It goes without saying that a layer structure of a domain wall displacement type magneto-optical medium is not limited to the structure described above, and various layer structures described in Japanese Patent Laid-Open No. 6-290496 or the like may be adopted.

In addition, with respect to an information track, as shown in FIG. 1B, two rows of tracks, i.e., track T1 and track T2 are provided at an equal width in each groove G. An area A being changed in magnetism through an annealing processing is provided at a center of each groove G. Likewise, an area B being changed in magnetism through the annealing processing is provided along a center of each land L. Then, the track T1 and the track T2 are magnetically separated from each other through the area A and the area B.

More specifically, a land width $W_L$ is 0.2 µm, a groove width $W_G$ is 0.8 µm, and a land pitch $P_L$ is 1.0 µm, and a groove depth D is 0.03 µm. The annealed area A along the center of each groove has a width of about 0.2 µm, and the annealed area B on each land takes up nearly the whole land width $W_L$. Note that, the land width and the groove width may be reversed so that the land width $W_L$ is 0.8 µm and the groove width $W_G$ is 0.2 µm. In such case, the track T1 and the track T2 are provided in each land L in order to carry out the recording.

Figure 2:
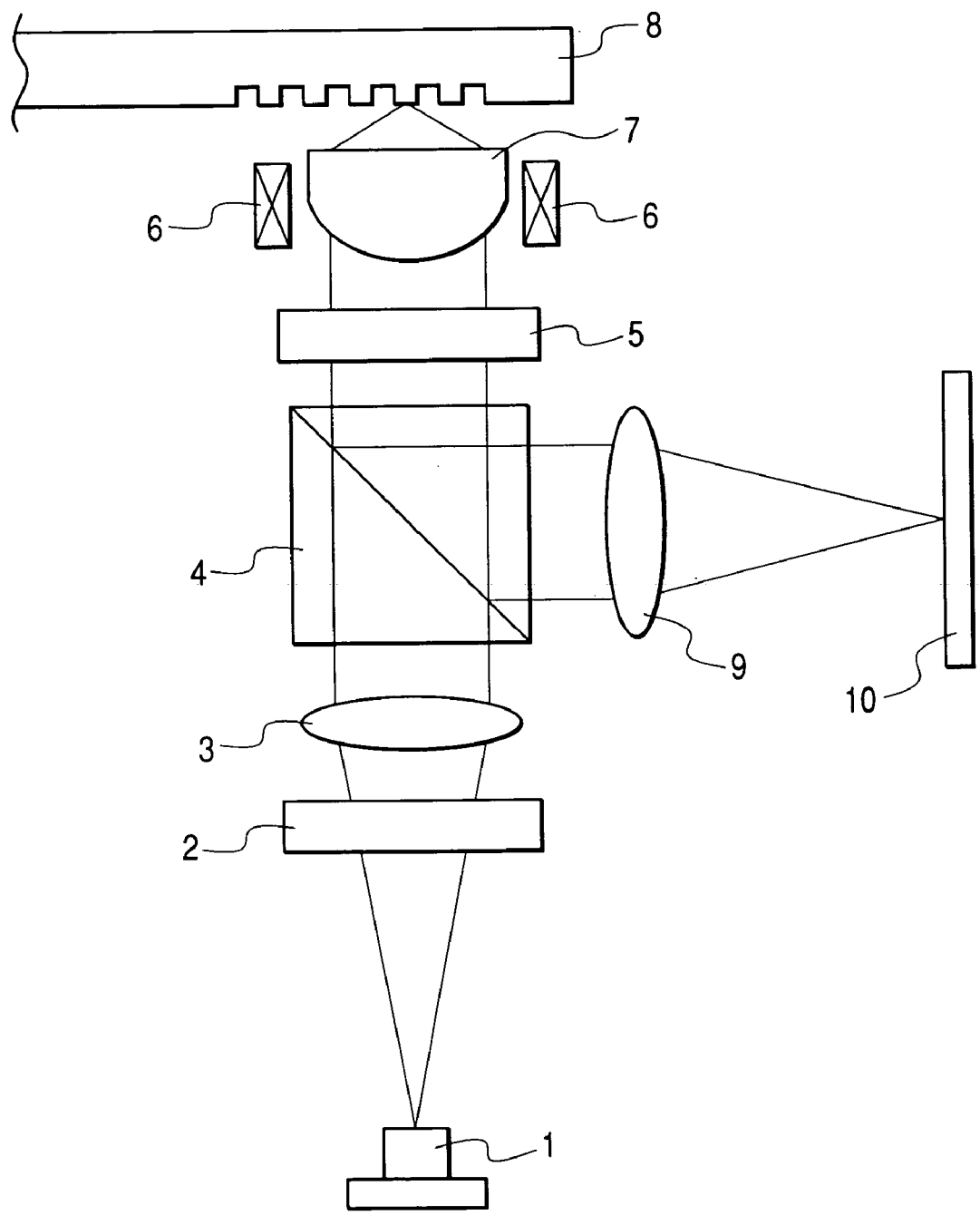
FIG. 2 is a view showing a structural example of an optical system of an annealing apparatus for annealing the magneto-optical disc shown in FIGS. 1A and 1B.

Next, description will hereinbelow be given with respect to a method of changing magnetism of the areas along the center of each groove G and each land L through the annealing processing. FIG. 2 shows an example of an optical system for use in the annealing processing for the magneto-optical disc 8. First of all, a beam with 410 nm wavelength emitted from a semiconductor laser 1 is optically divided into three beams by a diffraction grating 2, and each of the resultant three beams is collimated by a coupling lens 3. Thereafter, the collimated beams are transmitted through a polarization beam splitter 4, transmitted through a quarter-wave plate 5, and then condensed by an objective lens 7 with 0.85 NA the position of which is controlled by actuators 6 to be made incident to the magneto-optical disc 8 from the film surface side.

A reflected light from an information recording surface of the magneto-optical disc 8 is transmitted through the objective lens 7 again, transmitted through the quarter-wave plate 5, reflected by the polarization beam splitter 4, and then transmitted through a sensor lens 9 to be made incident to a light receiving element 10. A focus error signal is obtained by utilizing an astigmatism method using a main beam. In addition, the annealing processing is executed with a main beam converged by the objective lens 7.

Figure 3:
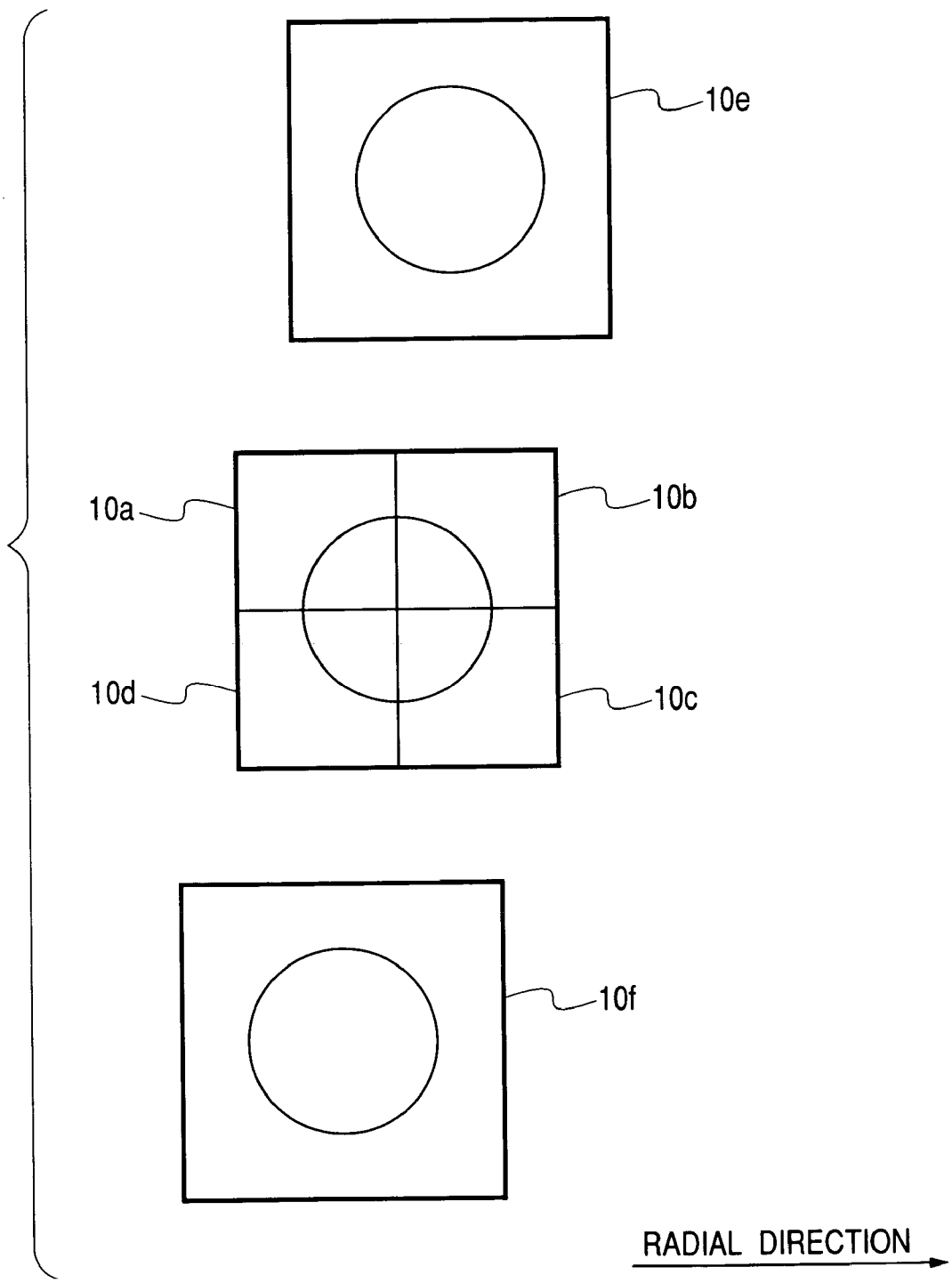
FIG. 3 is a view showing a light receiving surface of a light receiving element for use in the annealing apparatus shown in FIG. 2.

FIG. 3 shows a light receiving surface on the light receiving element 10. A reflected light of the main beam is received by four divided light receiving surfaces 10a, 10b, 10c and 10d on the light receiving element 10. Assuming that output signals thereof are assigned A, B, C and D, respectively, a signal which is obtained on the basis of the arithmetic operation of (A+C)−(B+D) is used as a focus error signal.

Figure 4:
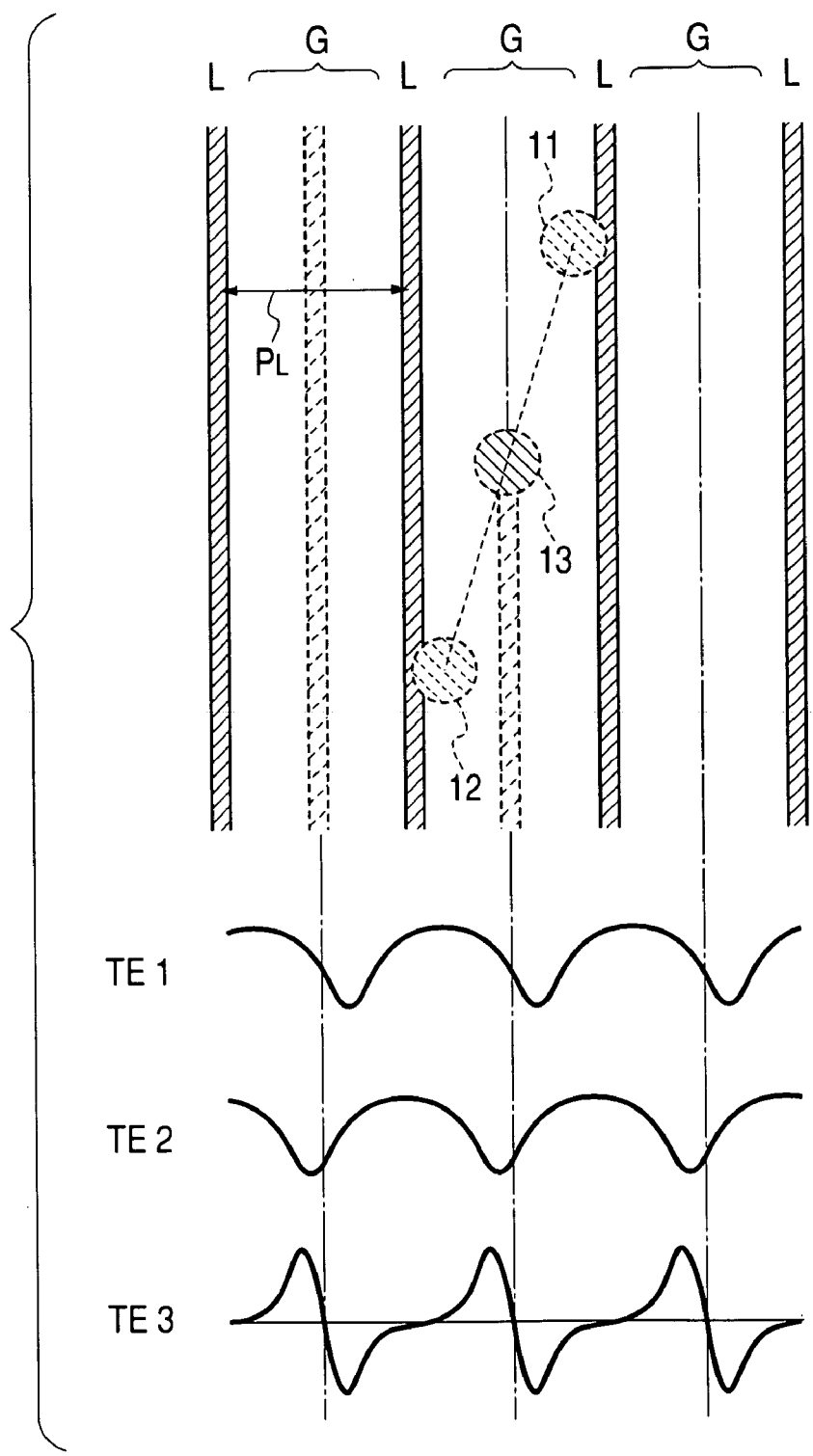
FIG. 4 is a view showing beam spots on a recording surface and a tracking error signal when each groove center of the magneto-optical disc shown in FIGS. 1A and 1B is annealed.

Next, description will hereinbelow be given with respect to a tracking method when the magneto-optical disc 8 is annealed. FIG. 4 shows beam spots on a medium surface, and a tracking error signal for a spot position on an information recording surface of a main beam 13 when the area A along the center of each groove G of the magneto-optical disc 8 is annealed.

A spot size is shown substantially in half maximum full-width. A distance of sub-beam 11 and sub-beam 12 in the disc radial direction is roughly made equal to or larger than ¼ of a land pitch $P_L$ on the information recording surface, but equal to or smaller than a groove width $W_G$ so that the main beam 13 is located between the two sub-beams 11 and 12 in the middle thereof. Reflected lights of the sub-beams 11 and 12 are received by light receiving surfaces 10e and 10f on the light receiving element 10, respectively. Then, assuming that output signals thereof are assigned TE1 and TE2, respectively, the tracking control is carried out using a signal TE3 obtained on the basis of the following expression:

$$TE3 = TE1 - TE2$$

While thus carrying out the focus control and the tracking control, the area along the center of each groove G is scanned with the main beam 13 to thereby anneal the area A of each groove G.

Note that, as the tracking method, a push-pull signal of the sub-beams 11 and 12 may be used. In this case, a distance of the sub-beams 11 and 12 in the disc radial direction is set so as to be equal to the land pitch $P_L$ on the recording surface.

Figure 5:
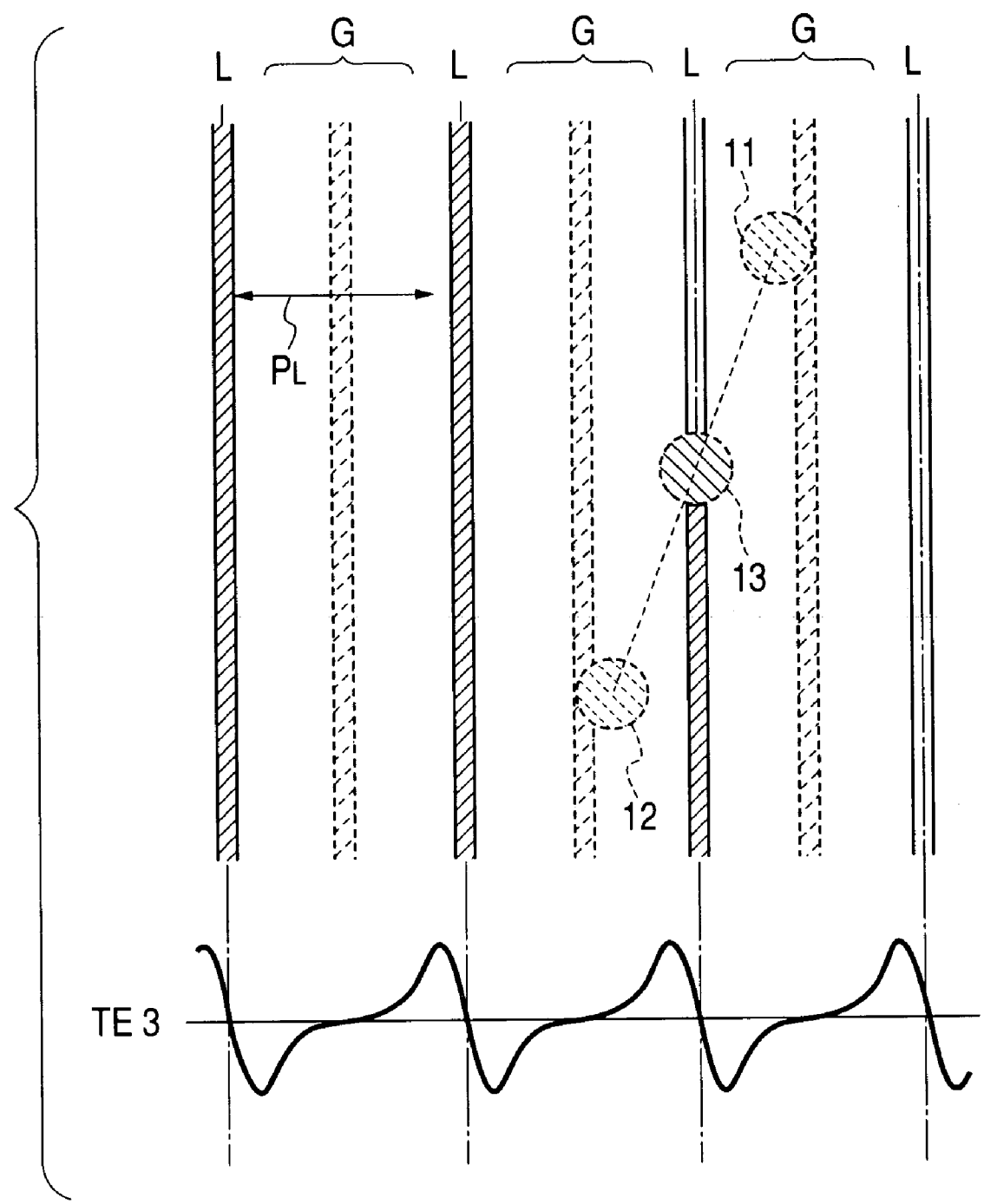
FIG. 5 is a view showing beam spots on a recording surface and a tracking error signal when each upper surface of lands of the magneto-optical disc shown in FIGS. 1A and 1B is annealed.

FIG. 5 shows beam spots on a medium surface, and a tracking error signal for a spot position of the main beam 13 when the area B on each land L of the magneto-optical disc 8 is annealed. In case where the area along the center of the land L is tracked with the main beam 13 as shown in FIG. 5, a reflected light of the main beam 13 is received by the four divided-light receiving surfaces 10a, 10b, 10c and 10d on the light receiving element 10. Then, assuming that output signals thereof are assigned A, B, C and D, respectively, the tracking control is carried out using a so-called push-pull signal obtained on the basis of the arithmetic operation of (A+D)−(B+C) as the tracking error signal.

The focus error signal is obtained in the same manner as that when each groove is annealed. Thus, the land L is scanned with the main beam 13 while carrying out the focus control and the tracking control using the push-pull signal as described above to thereby anneal the area B on the land L.

Thus, by changing the tracking method for the case where each groove is annealed and the case where each land is annealed, the annealing processing for the area A along the center of each groove and the area B on each land is executed.

Figure 6:
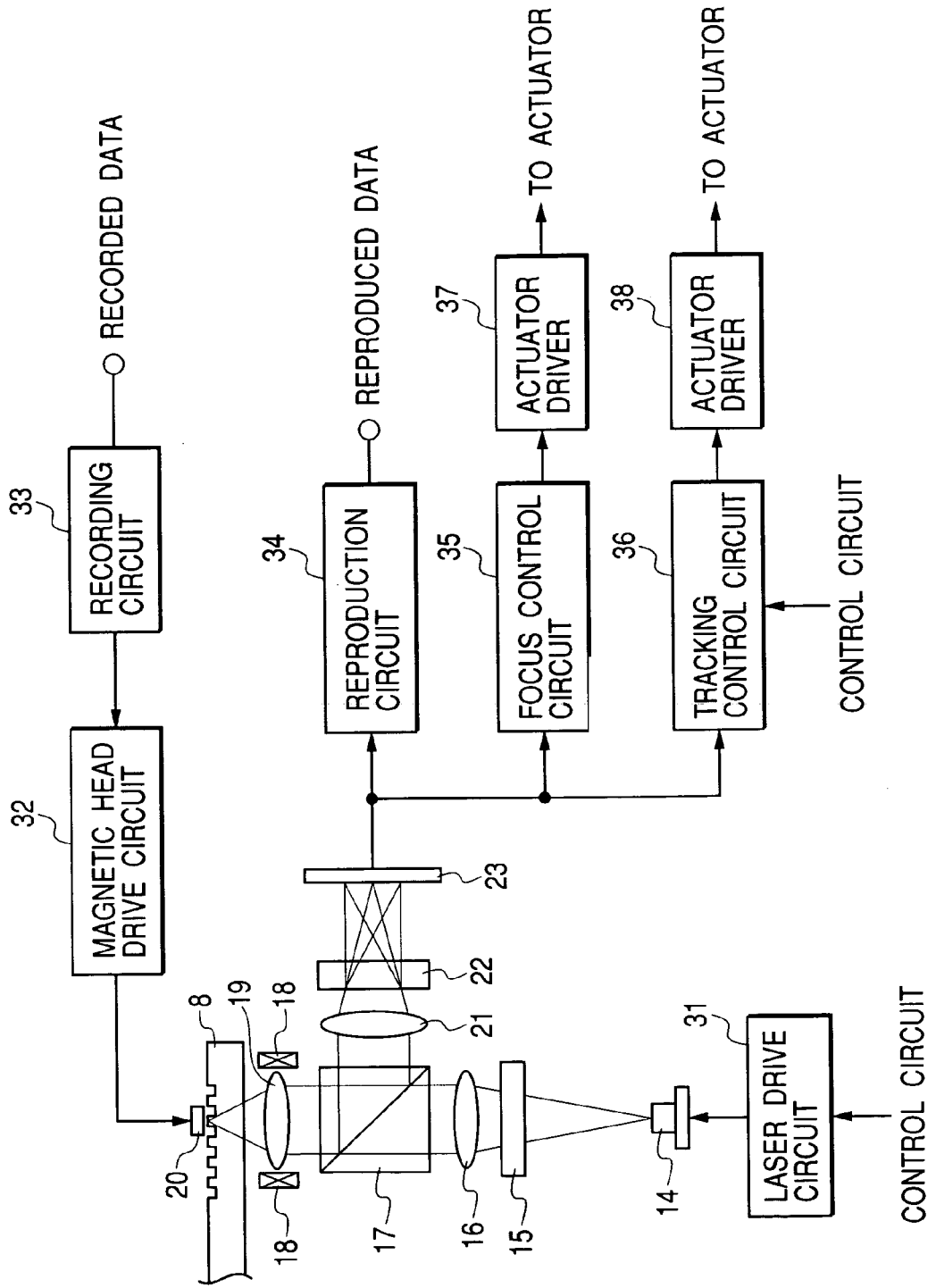
FIG. 6 is a block diagram showing the first embodiment of the optical information recording/reproducing apparatus according to the present invention.

Next, description will hereinbelow be given with respect to an apparatus for recording information or reproducing recorded information on or from the above-mentioned magneto-optical disc. FIG. 6 shows a configuration of a first embodiment of an optical information recording/reproducing apparatus according to the present invention. First of all, a beam with 650 nm wavelength emitted from a semiconductor laser 14 is optically divided into three beams including one main beam and two sub-beams by a diffraction grating 15. Each of the beams is collimated by a coupling lens 16, transmitted through a polarization beam splitter 17, and then condensed by an objective lens 19 with 0.6 NA the position of which is controlled by actuators 18 to be applied onto the magneto-optical disc 8 in the form of a minute spot.

A magnetic head 20 for applying a modulated magnetic field is provided above the upper surface of the magneto-optical disc 8 so as to face the objective lens 19. A reflected light from an information recording surface of the magneto-optical disc 8 is transmitted through the objective lens 19 again and reflected by the polarization beam splitter 17 to be made incident to a light receiving element 23 through a sensor lens 21 and a Wollaston prism 22.

In addition, in the figure, reference numeral 31 designates a laser drive circuit for driving the semiconductor laser 14, reference numeral 32 designates a magnetic head drive circuit for driving the magnetic head 20, reference numeral 33 designates a recording circuit for modulating recorded data to generate a recording signal, and reference numeral 34 designates a reproduction circuit for generating a reproduction signal on the basis of output signals from the light receiving element 23 and executing predetermined signal processings using the resultant reproduction signal to thereby generate reproduced data.

Moreover, reference numeral 35 designates a focus control circuit for generating a focus error signal on the basis of the output signals from the light receiving element 23 to carry out the focus control on the basis of the resultant focus error signal, reference numeral 36 designates a tracking control circuit for generating a tracking error signal on the basis of the output signals from the light receiving element 23 to carry out the tracking control on the basis of the resultant tracking error signal, and reference numerals 37 and 38 designate actuator drivers for driving the actuators 18.

When the recorded information in the magneto-optical disc 8 is reproduced, a beam for reproduction which is the main beam 13 from the objective lens 19 is applied to the magneto-optical disc 8 to cause the domain wall displacement to thereby read out information. At this time, the reproduction circuit 34 generates the reproduction signal on the basis of the output signals from the light receiving element 23 to execute predetermined signal processings such as binarization and demodulation using the resultant reproduction signal to thereby obtain reproduced data. Note that, since the domain wall displacement reproduction is well known, the detailed description thereof is omitted here for the sake of simplicity.

Meanwhile, when information is recorded on the magneto-optical disc 8, a magnetic field which is modulated in accordance with a recording signal is applied from the magnetic head 20 to the magneto-optical disc 8 while applying a beam for recording having a fixed intensity which is the main beam 13 from the objective lens 19 to the magneto-optical disc 8, to thereby record information on the magneto-optical disc 8. In this case, the magnetic head 20 is driven by the magnetic head drive circuit 32, and the semiconductor laser 14 is driven by the laser drive circuit 31 to apply the modulated magnetic field to the magneto-optical disc 8 while applying the light beam for recording on the magneto-optical disc 8 to thereby record information on the magneto-optical disc 8. Incidentally, the focus error signal upon recording/reproducing information is generated by utilizing the astigmatism method using the reflected light of the main beam.

Figure 7:
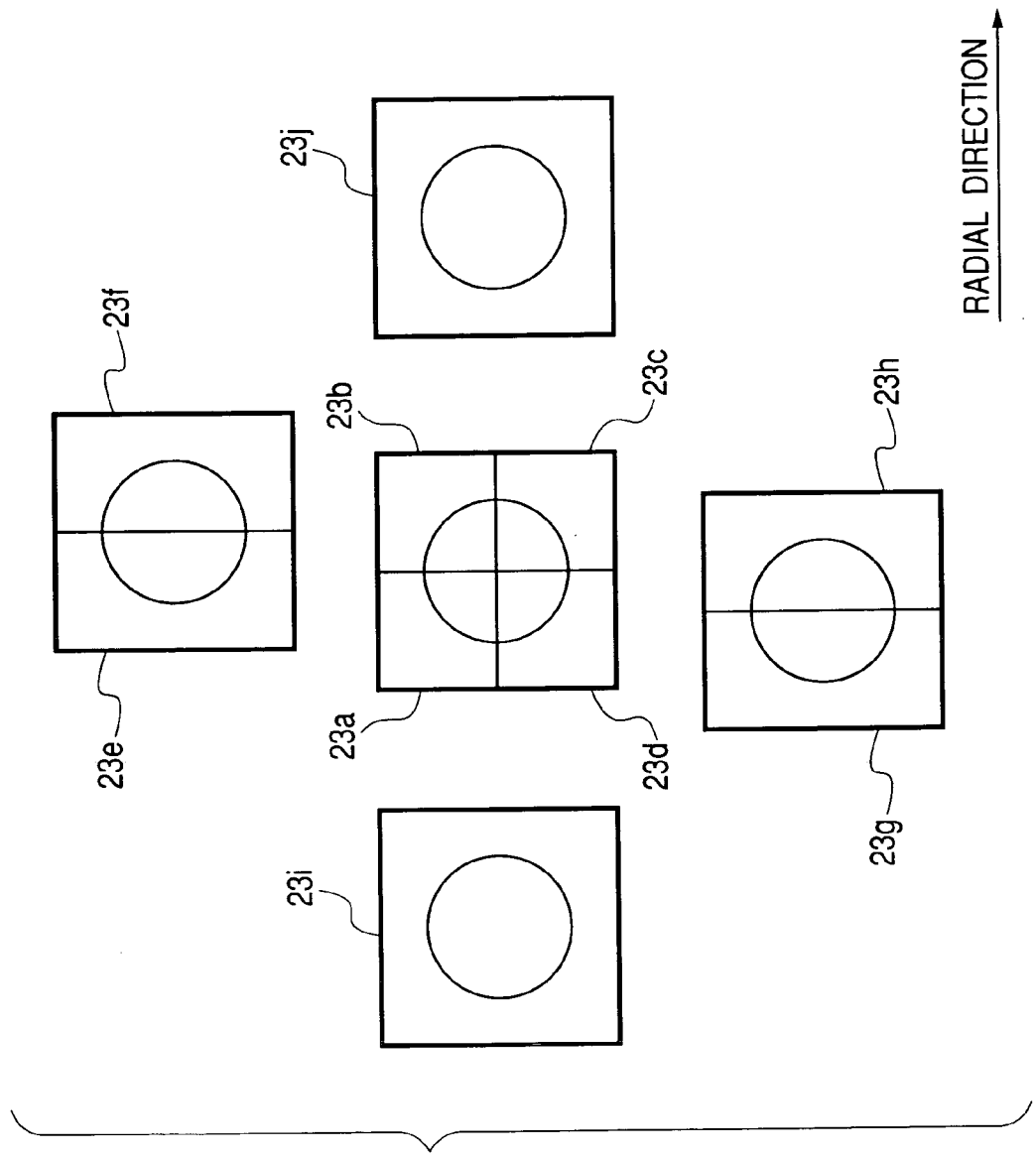
FIG. 7 is a diagram showing a light receiving surface of a light receiving element for use in the optical information recording/reproducing apparatus shown in FIG. 6.

FIG. 7 shows the light receiving surface on the light receiving element 23. The reflected light of the main beam is received by the four divided light receiving surfaces 23a, 23b, 23c and 23d on the light receiving element 23. Then, assuming that output signals thereof are assigned A, B, C and D, respectively, a signal which is obtained on the basis of the arithmetic operation of (A+C)−(B+D) is used as a focus error signal. The focus error signal is obtained by utilizing the above-mentioned astigmatism method. The focus control circuit 35 generates the focus error signal and carries out the focus control so that the main beam is focused on the information recording surface of the medium on the basis of the resultant focus error signal.

Meanwhile, when a reproduction signal is generated, two beams polarized and separated by the Wollaston prism 22 into components orthogonal to each other are received by light receiving surfaces 23i and 23j, respectively. Then, assuming that output signals thereof are assigned I and J, respectively, a reproduction signal is obtained by carrying out the arithmetic operation of (I−J). The reproduction circuit 34 thus generates the reproduction signal to generate reproduced data using the resultant reproduction signal.

Figure 8:
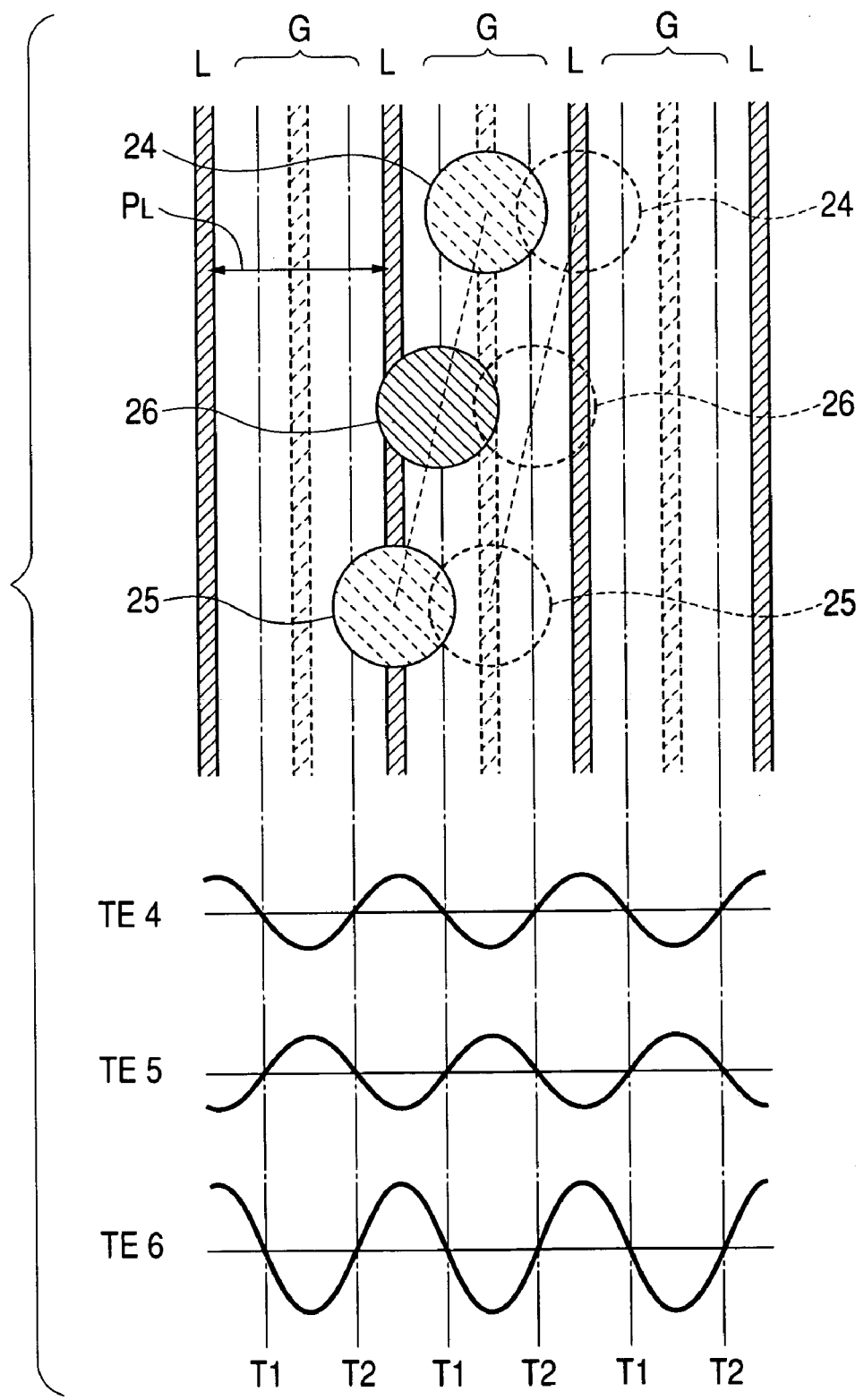
FIG. 8 is a view showing beam spots on a recording surface of a medium and a tracking error signal during recording or reproduction in the first embodiment.

Next, description will hereinbelow be given with respect to a tracking method when information is recorded and reproduced on and from the magneto-optical disc 8. FIG. 8 shows beam spots on a medium surface and a tracking error signal when information is recorded and reproduced on and from the magneto-optical disc 8. The spot size is shown substantially in half maximum full-width.

A distance between sub-beam 24 and sub-beam 25 in the disc radial direction is made equal to ½ of the land pitch $P_L$ on the information recording surface of the medium, and a main beam 26 is made located between the sub-beams 24 and 25 in the middle thereof. Reflected lights of the sub-beams 24 and 25 are received by light receiving surfaces 23e, 23f, and 23g, 23h of the magneto-optical disc 8, respectively, which are obtained by dividing the light receiving elements into two parts in a radial direction of the magneto-optical disc 8. Assuming that output signals thereof are assigned E, F, and G, H, respectively, so-called push-pull signals are respectively obtained by carrying out the following arithmetic operations:

$$TE4=E-F$$

$$TE5=G-H$$

At this time, each of the push-pull signals TE4 and TE5 becomes a periodic signal having the land pitch $P_L$ as a period. Assuming that a distance between the sub-beams 24 and 25 is ½ of the land pitch $P_L$, the push-pull signals TE4 and TE5 of the sub-beams 24 and 25 are out of phase with each other by a half period. Accordingly, by further carrying out the arithmetic operation of TE4−TE5, a tracking signal TE6 can be obtained by utilizing the well-known differential push-pull method. The tracking control circuit 36 thus generates the tracking error signal, and carries out the tracking control so that he main beam 26 traces the information tracks T1 and T2 on the basis of the resultant tracking error signal TE6.

In addition, by changing a polarity of the tracking error signal, a beam can be drawn into either track interchangeably from the track T1 to the track T2, or from the track T2 to the track T1. The operation for changing the polarity of the tracking error signal is carried out by a control circuit (not shown). FIG. 8 shows a state in which one of the two rows of information tracks of the groove G is traced with the sub-beams and the main beam.

As described above, the light beam for recording/reproduction can be accurately tracking-controlled so that two rows of information tracks within one groove (or land) of the magneto-optical disc 8 are respectively traced with the beam.

(Second Embodiment)

Figure 9:
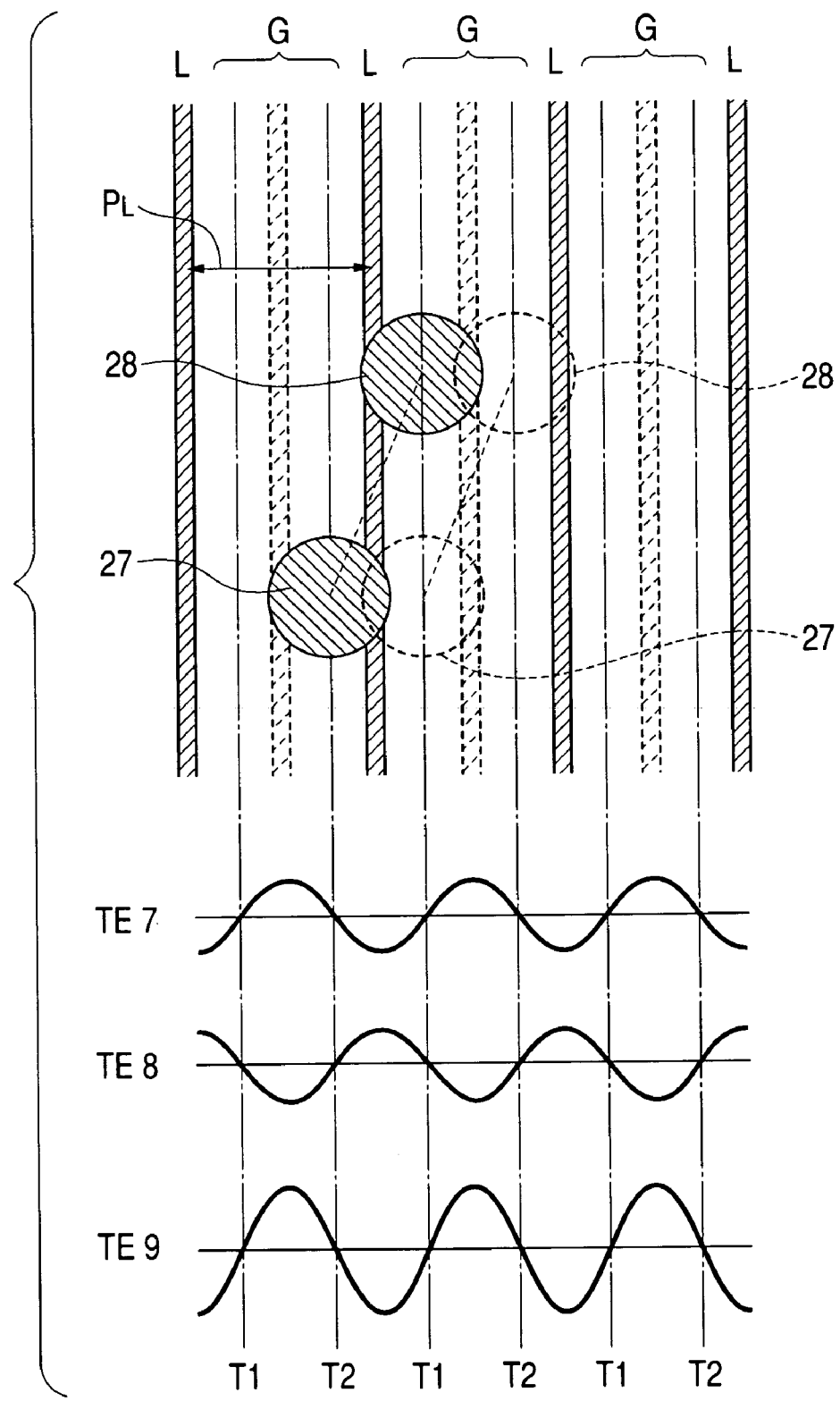
FIG. 9 is a view showing beam spots on a recording surface of a medium and a tracking error signal during recording or reproduction in a second embodiment of the present invention.

Next, a second embodiment of the present invention will hereinbelow be described in detail. FIG. 9 shows beam spots on a medium surface and a tracking error signal during recording/reproduction according to a second embodiment of the present invention. The magneto-optical disc 8 in this embodiment is the same as that shown in FIGS. 1A and 1B. It should be noted that a configuration of an optical information recording/reproducing apparatus is different in light receiving element 23 from that of the optical information recording/reproducing apparatus shown in FIG. 6, and positions of beams spots on an information recording surface of the medium are different. Configurations of other constituent elements are the same as those of the constituent elements shown in FIG. 6. In the figure, reference numeral 27 designates a sub-beam, and reference numeral 28 designates a main beam. The sub-beam 27 is obtained by optically dividing a beam emitted from the semiconductor laser 14 of FIG. 6 into beams by the diffraction grating 15, and only one of the beams is used.

In this embodiment, a distance between the sub-beam 27 and the main beam 28 in the disc radial direction is made equal to a half of the land pitch $P_L$ on the information recording surface of the medium. In this connection, information is recorded and reproduced on and from the magneto-optical disc 8 using the main beam 28 converged by the objective lens 19, and the focus error signal is generated by utilizing the astigmatism method using the reflected light of the main beam 28.

Figure 10:
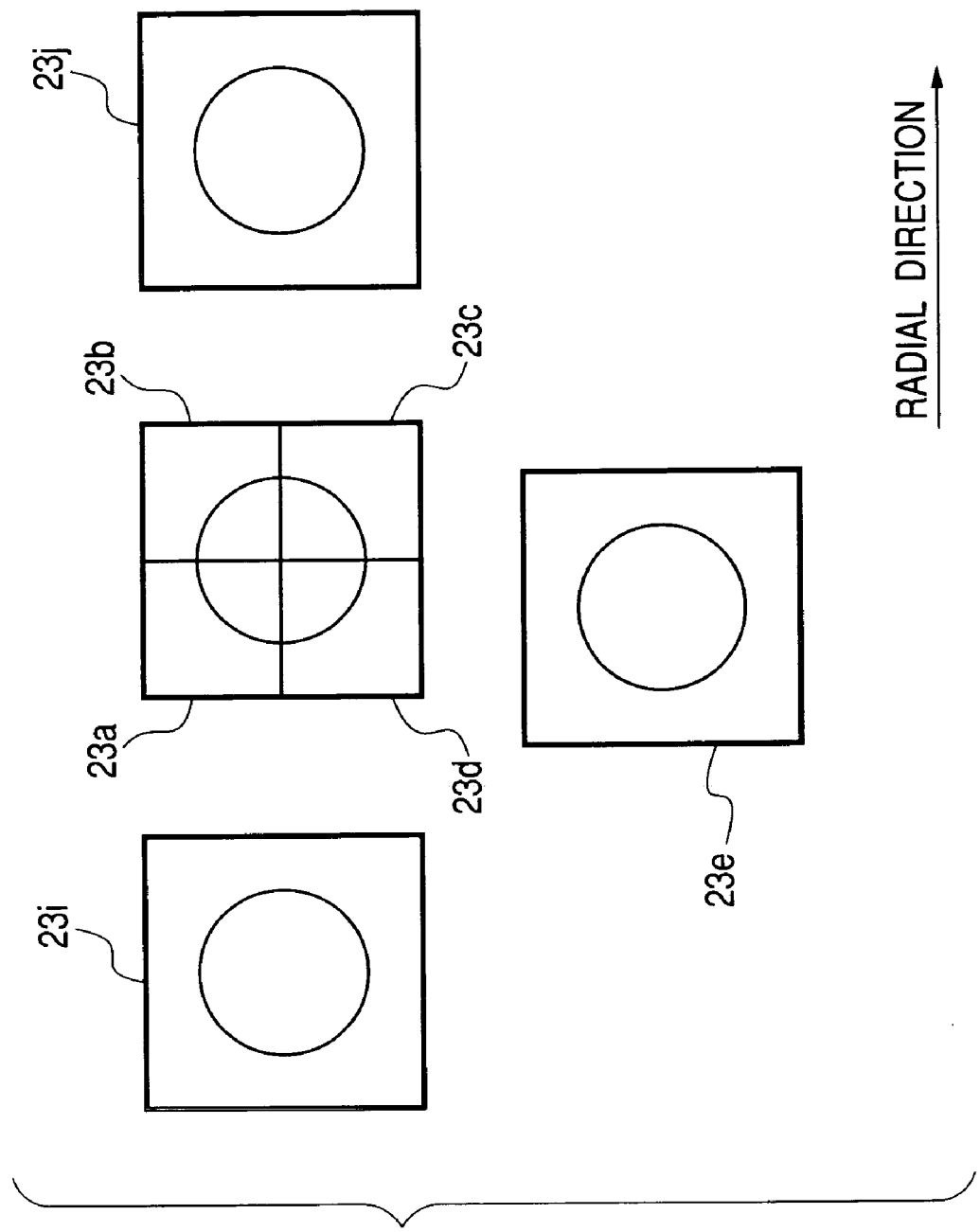
FIG. 10 is a view showing a light receiving surface of a light receiving element for use in the second embodiment.

FIG. 10 shows a light receiving surface on the light receiving element 23 used in this embodiment. The reflected light of the main beam 28 is received by four divided light receiving surfaces 23a, 23b, 23c and 23d on the light receiving element 23, respectively. Then, assuming that output signals thereof are assigned A, B, C and D, respectively, a focus error signal is obtained on the basis of the arithmetic operation of (A+C)−(B+D). The focus control circuit 35 thus generates the focus error signal on the basis of the arithmetic operation, and carries out the focus control on the basis of the resultant focus error signal.

In addition, in case where a reproduction signal is generated, similarly to the first embodiment, two beams polarized and separated by the Wollaston prism 22 into components orthogonal to each other are received by light receiving surfaces 23i and 23j, respectively. Then, assuming that output signals thereof are assigned I and J, respectively, a reproduction signal is obtained by carrying out the arithmetic operation of I−J.

With respect to a tracking error signal, reflected lights of the sub-beam 27 and the main beam 28 are used. Assuming that a signal which is obtained by receiving the reflected light of the sub-beam 27 by the light receiving surface 23e on the light receiving element 23 is assigned E, signals which are obtained by receiving the reflected light of the main beam 28 by the four divided light receiving surfaces 23a, 23b, 23c and 23d on the light receiving element 23 are assigned A, B, C and D, respectively, and quantities of incident lights of the sub-beam and the main beam to the magneto-optical disc 8 are assigned P1 and P2, respectively, a tracking error signal TE9 is obtained by carrying out the following arithmetic operations:

$$TE7=E$$

$$TE8=(A+B+C+D)$$

$$TE9=TE8-(TE7 \cdot P2/P1)$$

The tracking control circuit 36 generates the tracking error signal on the basis of the arithmetic operations, and carries out the tracking control on the basis of the resultant tracking error signal.

In addition, similarly to the first embodiment, by changing a polarity of the tracking error signal, a beam can be drawn into either track interchangeably from the information track T1 to the information track T2, or from the information track T2 to the information track T1. This changing operation is carried out by the control circuit.

As described above, in this embodiment, the beam for recording/reproduction can be accurately tracking-controlled without using divided light receiving elements so that two rows of information tracks within one groove (or land) are traced with the beam. In addition, in the second embodiment, since the light receiving element is simplified as compared with the first embodiment, the structure of the optical information recording medium can be simplified all the more. In addition, as compared with the tracking method using a push-pull signal, this embodiment has a superior advantage in that no offset due to shift or tilt of the objective lens in the radial direction of the disc is caused.

Note that, in the second embodiment, it has been described that the distance between the sub-beam 27 and the main beam 28 in the disc radial direction is made equal to a half of the land pitch on the information recording surface. However, the present invention is not intended to be limited thereto and the distance may be a distance of N/2 (N: positive odd number) of the land pitch.

(Third Embodiment)

Figure 11A:
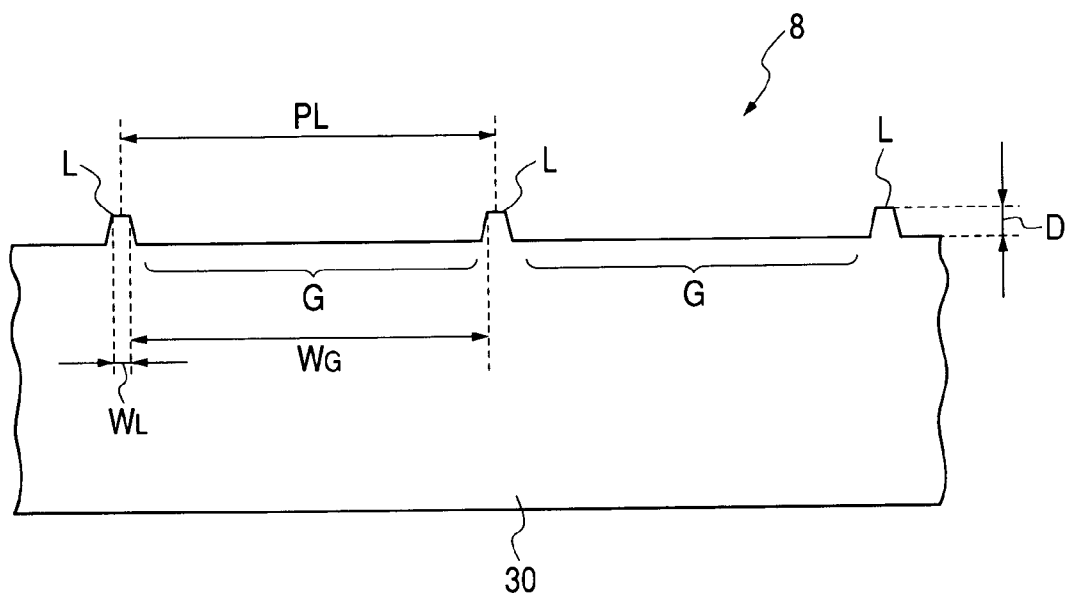
FIGS. 11A and 11B are cross sectional views each showing a magneto-optical disc for use in a third embodiment of the present invention.
Figure 11B:
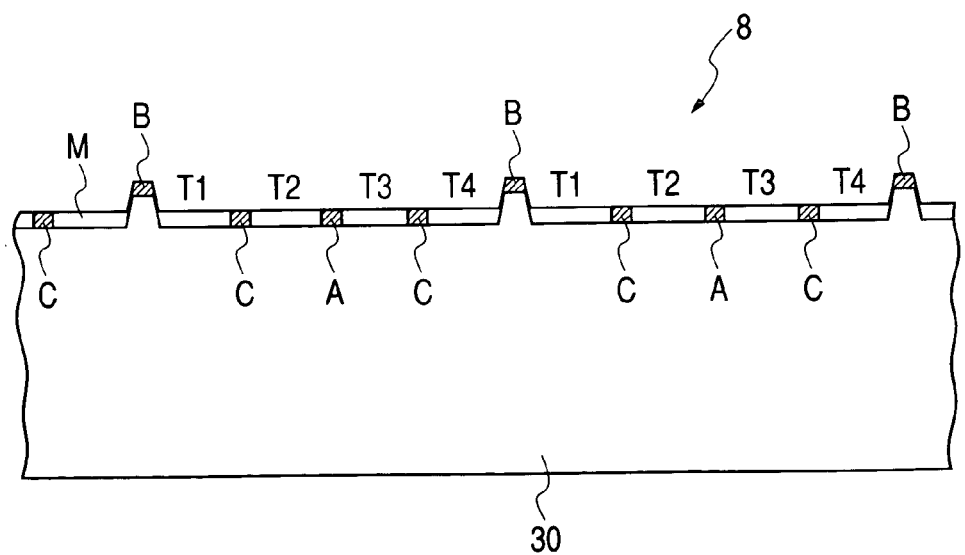

FIGS. 11A and 11B show another embodiment of the magneto-optical disc. In this embodiment, an example is shown in which the magneto-optical disc has four information tracks within one groove. FIG. 11A is a cross sectional view of a substrate of the magneto-optical disc, and FIG. 11B is a cross sectional view of the magneto-optical disc. The magneto-optical disc 8 is a domain wall displacement type magneto-optical medium. A magnetic film M in which a displacement layer, a switching layer, and a recording layer are laminated is formed on the substrate 30. It should be noted that a layer structure of the domain wall displacement type magneto-optical medium is not limited thereto.

In addition, with respect to an information track, as shown in FIG. 11B, four rows of tracks, i.e., tracks T1, T2, T3 and T4 are provided at an equal width in each groove G. An area A being changed in magnetism through an annealing processing is provided along a center of each groove G. Areas C being changed in magnetism through the annealing processing are provided along both sides of the area A so as to be apart therefrom by ¼ of the land pitch $P_L$. Likewise, an area B being changed in magnetism through the annealing processing is provided along a center of each land L. The tracks T1, T2, T3 and T4 are magnetically separated from each other through the area A, the areas B and the areas C.

A land width $W_L$ is 0.2 μm, a groove width $W_G$ is 2.0 μm, and a land pitch $P_L$ is 2.20 μm, and a groove depth D is 0.03 μm. The annealed areas A and C of each groove have a width of about 0.2 μm, and the annealed area B on each land takes up nearly the whole land width $W_L$. Note that the land width and the groove width may be reversed so that the land width $W_L$ is 2.0 μm and the groove width $W_G$ is 0.2 μm. In this case, the tracks T1, T2, T3 and T4 are provided in each land L in order to carry out the recording.

Figure 12:
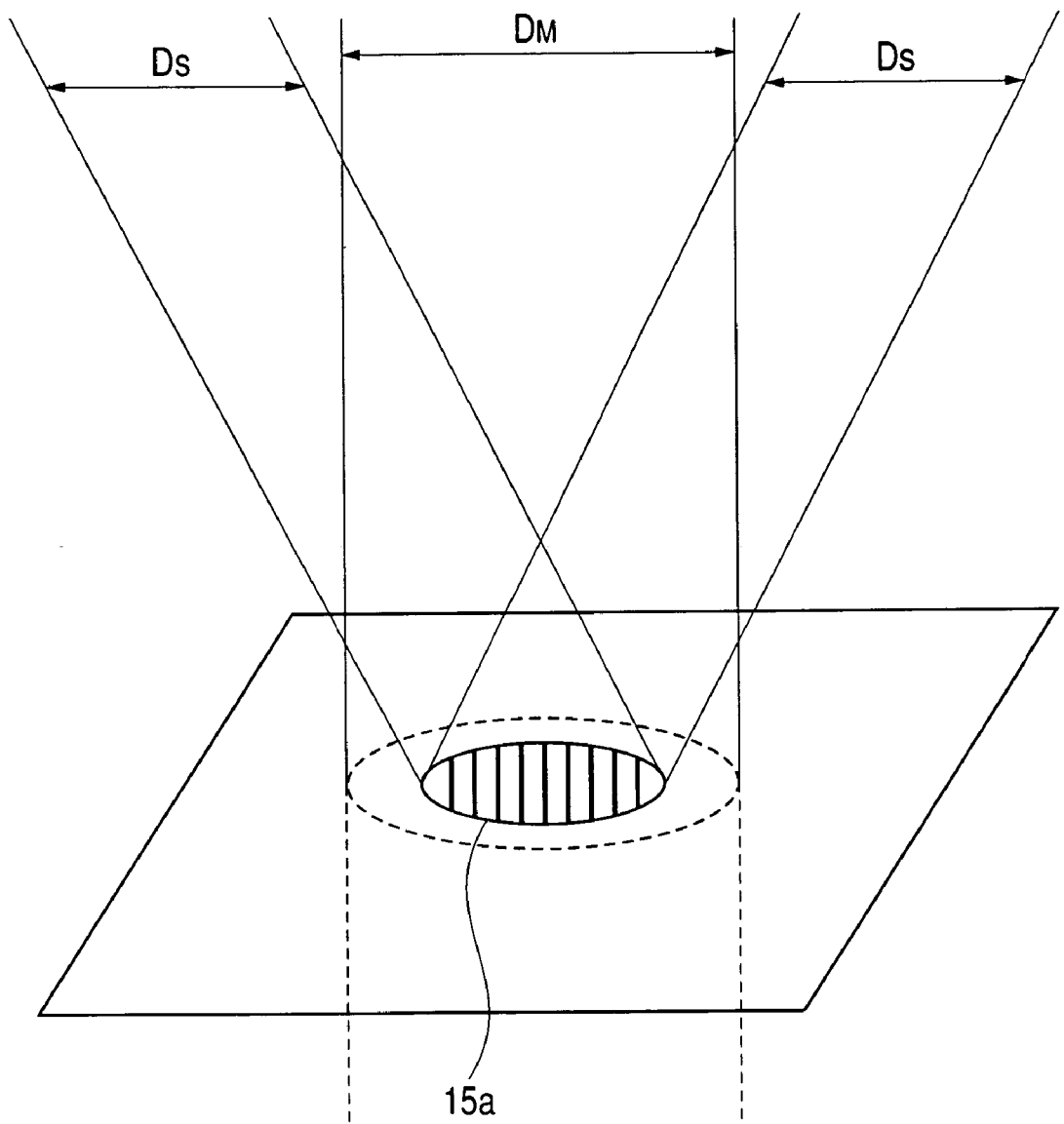
FIG. 12 is a view showing a diffraction grating of an optical system for use in an annealing processing for the magneto-optical disc shown in FIGS. 11A and 11B.
Figure 13:
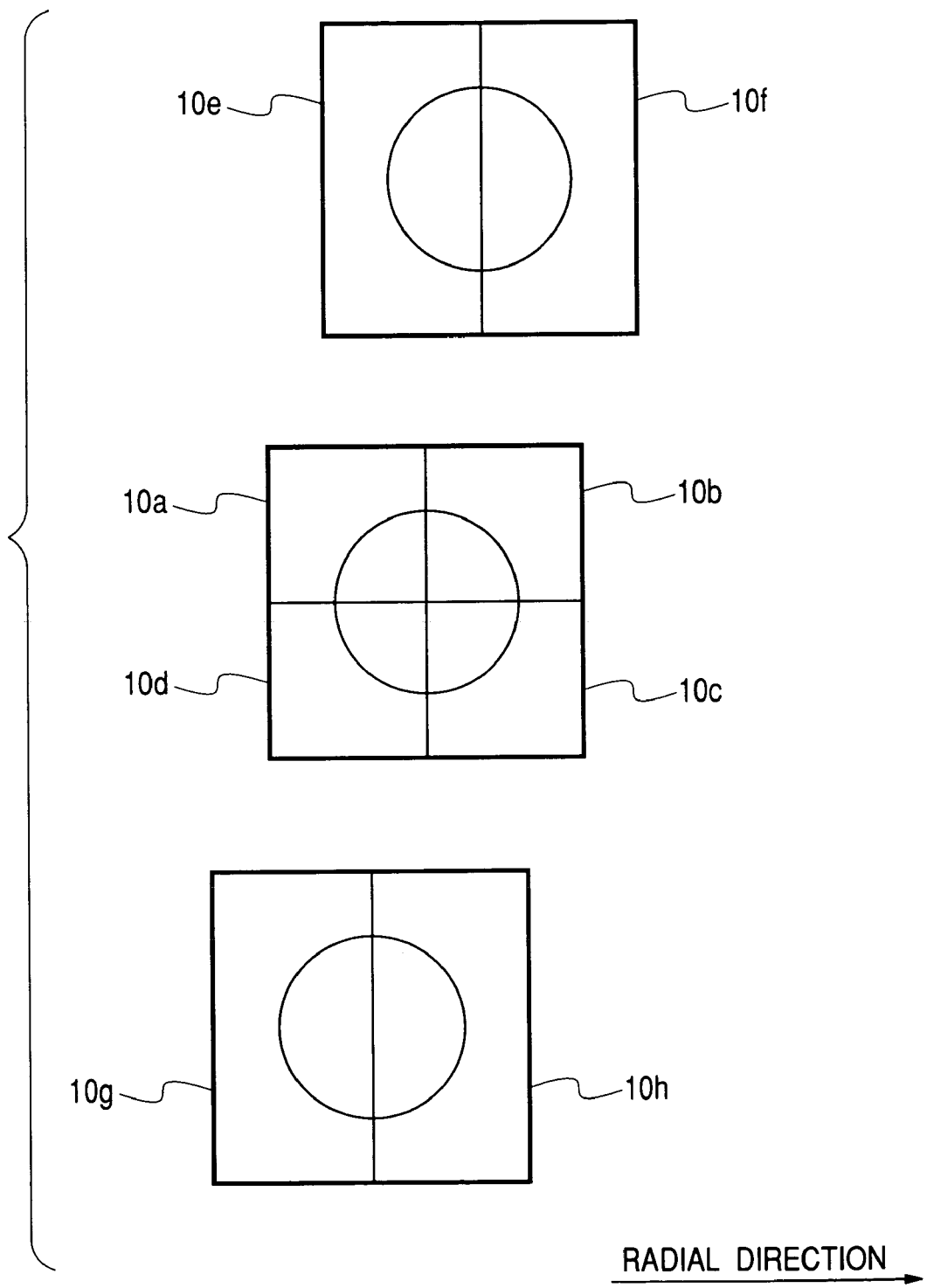
FIG. 13 is a view showing a light receiving element of an optical system for use in the annealing processing for the magneto-optical disc shown in FIGS. 11A and 11B.

Next, description will hereinbelow be given with respect to a method in which annealing processing is performed to change the magnetism of the following areas: an area along a center of each groove; areas along both sides of the above-mentioned area along the center of the groove which are apart therefrom by ¼ of the land pitch $P_L$; and an area along a center of each land L. While a construction of an apparatus for use in the annealing processing is nearly the same as that of the apparatus shown in FIG. 2, the diffraction grating 2 and the light receiving element 10 in this embodiment are different in structure from those shown in FIG. 2. FIG. 12 shows the diffraction grating used in this embodiment, and FIG. 13 shows the light receiving element for use therein.

Figure 14:
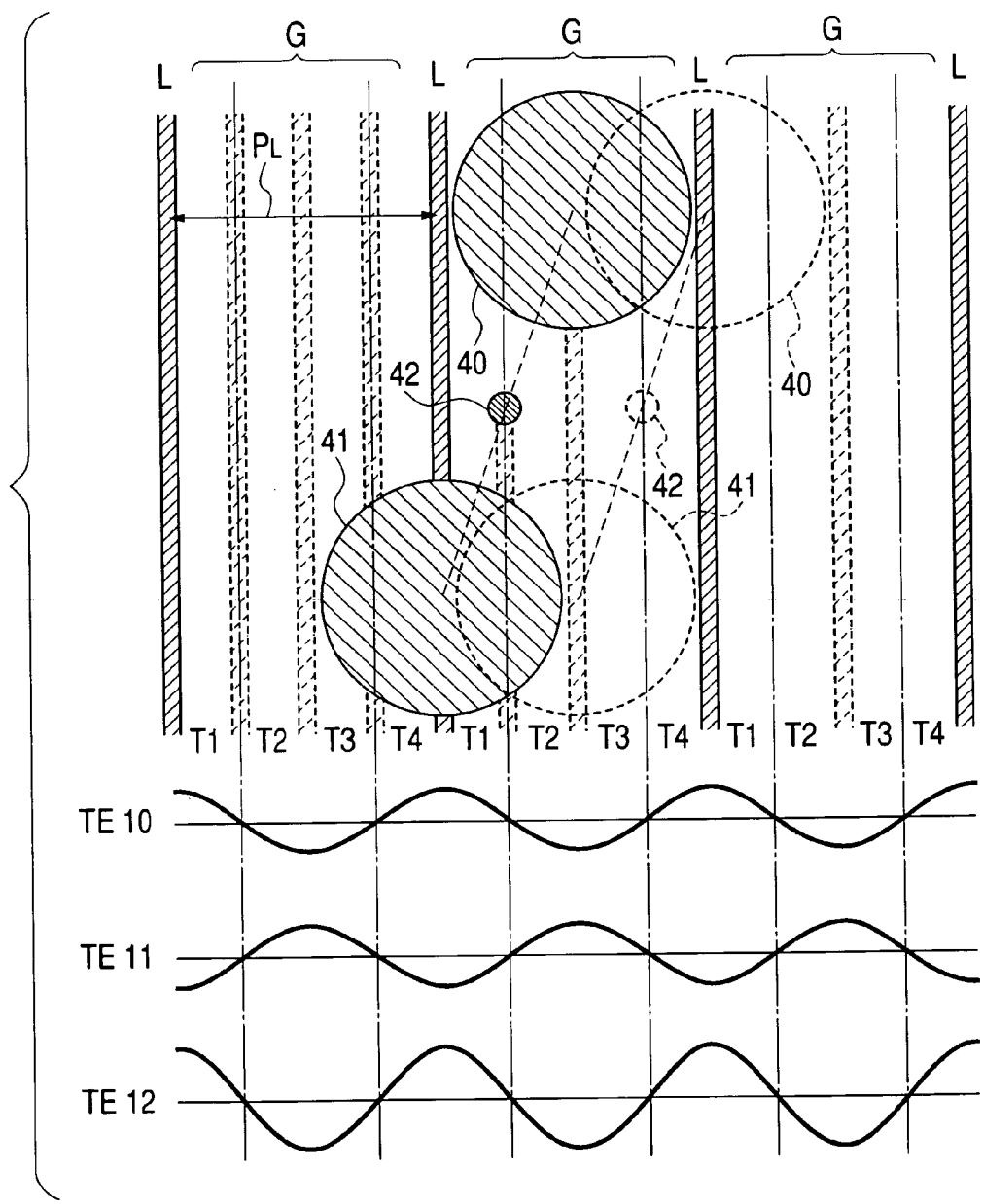
FIG. 14 is a view showing beam spots on a medium and a tracking error signal when the magneto-optical disc shown in FIGS. 11A and 11B is annealed.

Subsequently, a method of the annealing processing will hereinbelow be described. Firstly, a method of annealing the area A along the center of each groove G and the area B of each land L is the same as that in the first embodiment. FIG. 14 shows a beam arrangement when both areas C, which are apart from the area along the center of each groove by ¼ of the land pitch, are tracked with beams for the annealing. A distance between sub-beams 40 and 41 in the disc radial direction is made equal to ½ of the land pitch $P_L$ on the information recording surface of the medium, and a main beam 42 is located between the sub-beams 40 and 41 in the middle thereof.

In addition, a diffraction grating portion 15a of the diffraction grating, as shown in FIG. 12, has a circular shape which is smaller than an incident beam diameter $D_M$, a beam diameter $D_S$ of a diffracted light is made smaller than the incident beam diameter $D_M$ to decrease NA when the diffracted light is condensed on the magneto-optical disc 8, and each of the spots of the sub-beams 40 and 41 on the information recording surface is made substantially equal to the land pitch $P_L$. Reflected lights of the sub-beams 40 and 41, as shown in FIG. 13, are received by light receiving surfaces 10e, 10f and 10g, 10h which are obtained by dividing the light receiving elements into two parts in a radial direction of the magneto-optical disc 8. Then, assuming that output signals of the light receiving surfaces 10e, 10f and 10g, 10h are assigned E, F and G, H, respectively, so-called push-pull signals are respectively obtained by carrying out the following arithmetic operations:

$$TE10 = E - F$$

$$TE11 = G - H$$

Moreover, the arithmetic operation of TE10−TE11 is carried out to obtain a tracking error signal TE12 by utilizing the well-known differential push-pull method. Then, the areas C are annealed by using the tracking error signal TE12. Thus, the areas A and C within each groove, and the area B on each land are annealed.

Figure 15:
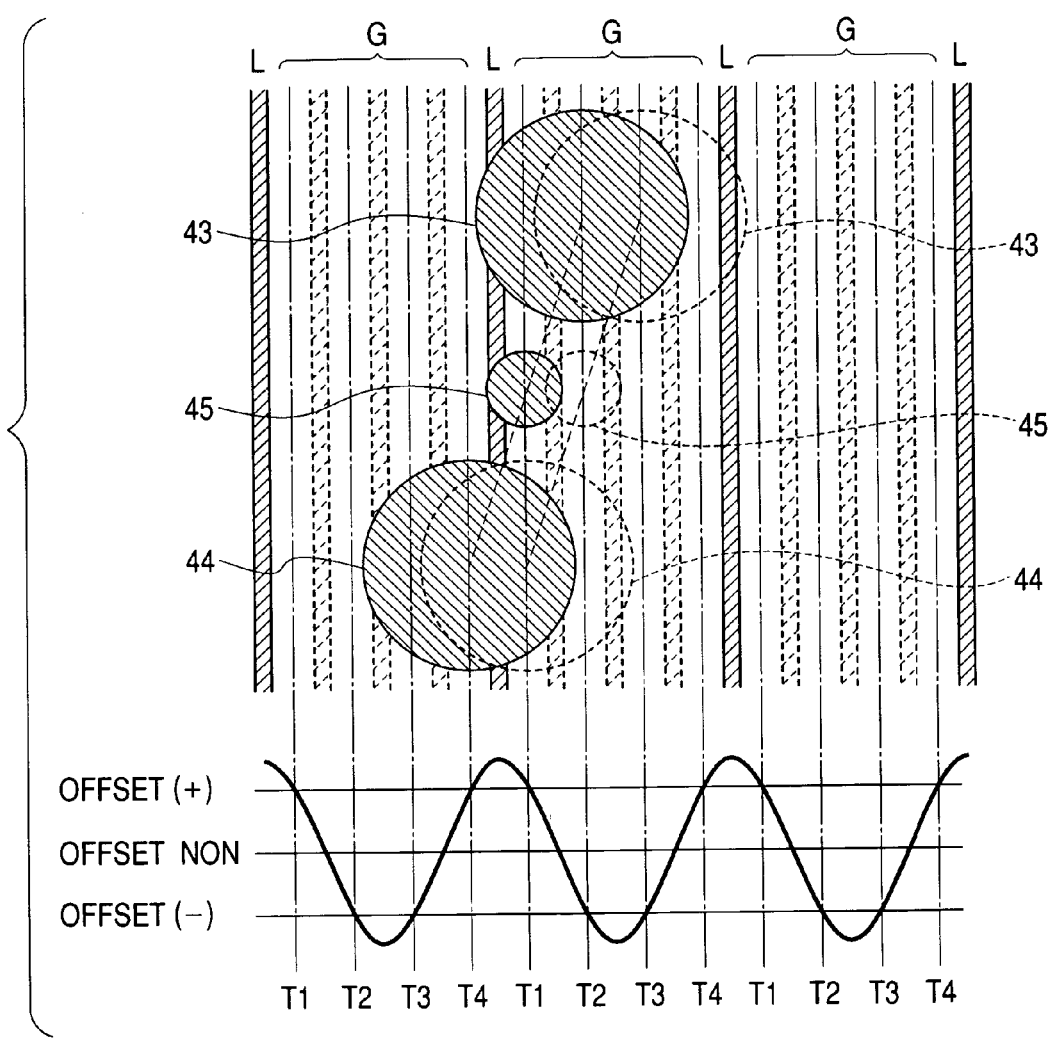
FIG. 15 is a view showing beam spots on a medium and a tracking error signal when information is recorded/reproduced on/from the magneto-optical disc shown in FIGS. 11A and 11B.
Figure 16:
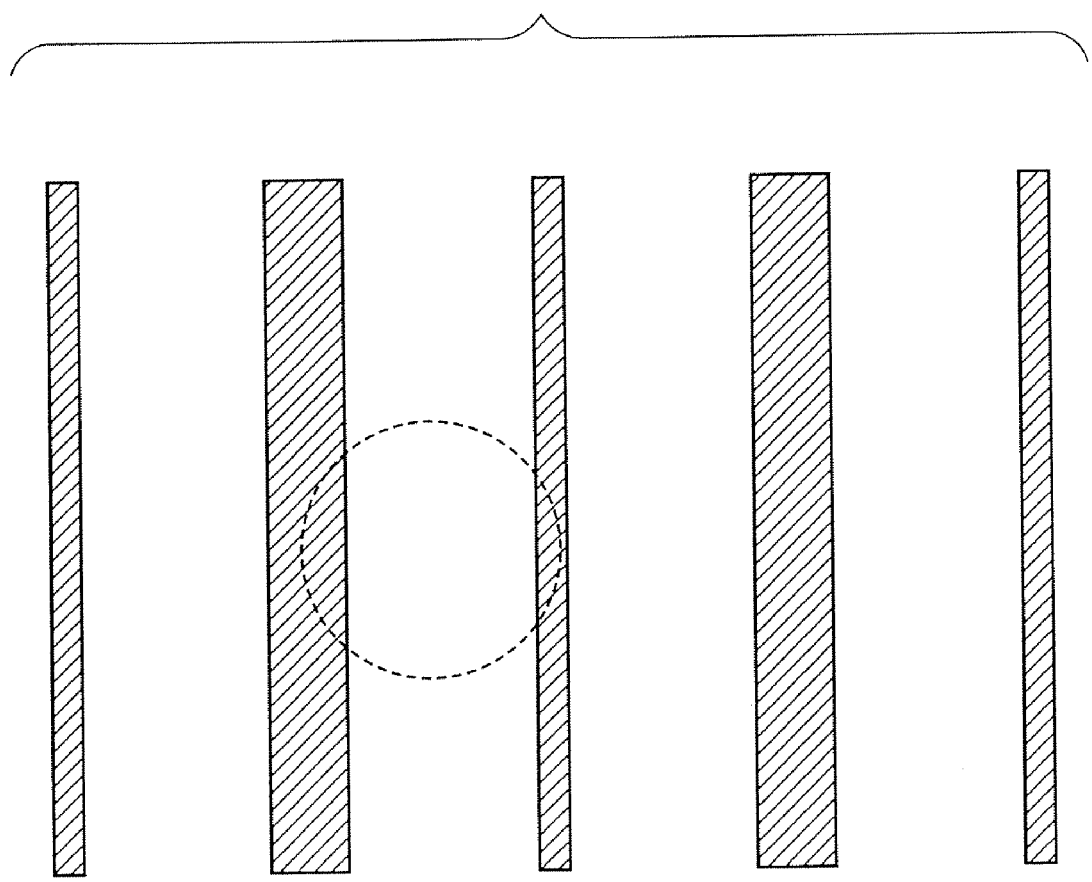
FIG. 16 is a view showing a conventional medium structure.

Next, description will hereinbelow be given with respect to an optical information recording/reproducing apparatus for recording/reproducing information on/from the magneto-optical disc 8 shown in FIG. 11B. A configuration of the apparatus is the same as that of the apparatus shown in FIG. 6 except that similarly to the case of the annealing processing, the diffraction grating shown in FIG. 12 is used as the diffraction grating 15. FIG. 15 shows a beam arrangement on the medium and a tracking error signal upon recording/reproduction. A distance between sub-beams 43 and 44 in the disc radial direction is made equal to ½ of the land pitch $P_L$ on the information recording surface of the medium, and a main beam 45 is located between the sub-beams 43 and 44 in the middle thereof.

In addition, the diffraction grating portion 15a of the diffraction grating, as shown in FIG. 12, has a circular shape which is smaller than the incident beam diameter $D_M$, the beam diameter $D_S$ of the diffracted light is made smaller than the incident beam diameter $D_M$ to decrease NA when the diffracted light is condensed on the magneto-optical disc 8, and each of the spots of the sub-beams 43 and 44 on the information recording surface is made substantially equal to the land pitch $P_L$.

When tracks T1 to T4 within each groove are tracked with the main beam, similarly to the annealing processing, the differential push-pull signal (TE12) is used. First of all, when the tracks T1 and T4 are tracked with the main beam, as shown in FIG. 15, a track offset is added to the tracking error signal to shift a tracking position by $P_L/8$. Note that, the control circuit shown in FIG. 6 carries out the addition of the track offset through the tracking control circuit 36.

In addition, when the tracks T2 and T3 are tracked with the main beam, a track offset of a polarity reverse to that when the tracks T1 and T4 are tracked is added to the tracking error signal, and under this condition, the tracking control is carried out. In such a manner, information is recorded/reproduced in/from the four information tracks within one groove or land. While only the tracking control has been described in this embodiment, it should be noted that the focus control and recording/reproduction of information are the same as those in case of FIG. 6.

Moreover, in the above-mentioned embodiments, the description has been given with respect to an example in which two or four information tracks are formed within one groove or land of the magneto-optical disc, and under this condition, information is recorded/reproduced. However, the present invention is not intended to be limited thereto. That is to say, it may also be available that three or five or more tracks are formed within one groove or land, and under this condition, information is recorded/reproduced. In such case, an offset and polarity are changed corresponding to a tracking position are carried out to thereby perform the tracking control for a desired track.

While in the above-mentioned embodiments, the magneto-optical recording medium is used, it should be noted that a material of a recording layer is not limited thereto, and hence a phase change material may also be used.

As set forth hereinabove, according to the present invention, even if the track density is increased beyond the optical resolution, the excellent recording/reproducing performance can be obtained, and hence the high densification of information recording can be realized as compared with the prior art.

What is claimed is:

1. A method of manufacturing a magneto-optical recording medium that includes: a substrate having lands and grooves; a recording layer formed on the substrate; at least two rows of information tracks adapted to record therein or reproduce therefrom information and formed in the recording layer on the lands or grooves; and denatured regions formed on the lands or grooves and between the information tracks, wherein the medium is a domain wall displacement type magneto-optical medium in which the recording layer includes at least a domain wall displacement layer, a switching layer, and a recording-and-holding layer, and wherein the denatured regions are areas in which magnetism is changed through an annealing processing, the method comprising the steps of:

applying two sub-beams and a main beam for annealing onto the recording layer, the main beam being located between the two sub-beams;

performing a first tracking control of receiving a reflected light of the main beam from the medium by a detection element which is divided into at least two parts in a radial direction of the medium and carrying out tracking control on the basis of outputs from the divided detection element;

performing a second tracking control of receiving reflected lights of the two sub-beams from the medium by two detection elements and carrying out tracking control on the basis of a difference in output between the two detection elements; and switching over between the first tracking control and the second tracking control to anneal a desired position of the grooves or lands.

2. A method of manufacturing a magneto-optical recording medium that includes: a substrate having lands and grooves; a recording layer formed on the substrate; at least two rows of information tracks adapted to record therein or reproduce therefrom information and formed in the recording layer on the lands or grooves; and denatured regions formed on the lands or grooves and between the information tracks, wherein the medium is a domain wall displacement type magneto-optical medium in which the recording layer includes at least a domain wall displacement layer, a switching layer, and a recording-and-holding layer, and wherein the denatured regions are areas in which magnetism is changed through an annealing processing, the method comprising the steps of:

applying two sub-beams and a main beam for annealing onto the recording layer, the main beam being located between the two sub-beams;

performing a first tracking control of receiving a reflected light of the main beam from the medium by a detection element which is divided into at least two parts in a radial direction of the medium and carrying out tracking control on the basis of outputs from the divided detection element;

performing a second tracking control of receiving the one or more reflected lights of the two sub-beams by the detection element which is divided into at least two parts in a radial direction of the medium and carrying out tracking control on the basis of outputs from the divided detection element; and switching over between the first tracking control and the second tracking control to anneal a desired position of the grooves or lands.

* * * * *

UNITED STATES PATENT AND TRADEMARK OFFICE
CERTIFICATE OF CORRECTION

| | |
|---|---|
| PATENT NO. | : 7,145,847 B2 |
| APPLICATION NO. | : 10/640024 |
| DATED | : December 5, 2006 |
| INVENTOR(S) | : Chihiro Nagura et al. |

It is certified that error appears in the above-identified patent and that said Letters Patent is hereby corrected as shown below:

<u>COLUMN 1</u>

Line 65, "in case" should read --in the case--.

<u>COLUMN 5</u>

Line 13, "In case" should read --In a case--.

<u>COLUMN 7</u>

Line 28, "he main" should read --the main--; and
Line 55, "beams spots" should read --beam spots--.

<u>COLUMN 8</u>

Line 18, "in case" should read --in a case--.

<u>COLUMN 11</u>

Line 4, "in case" should read --in the case--.

Signed and Sealed this

Fifth Day of June, 2007

JON W. DUDAS
*Director of the United States Patent and Trademark Office*